UNITED STATES PATENT OFFICE.

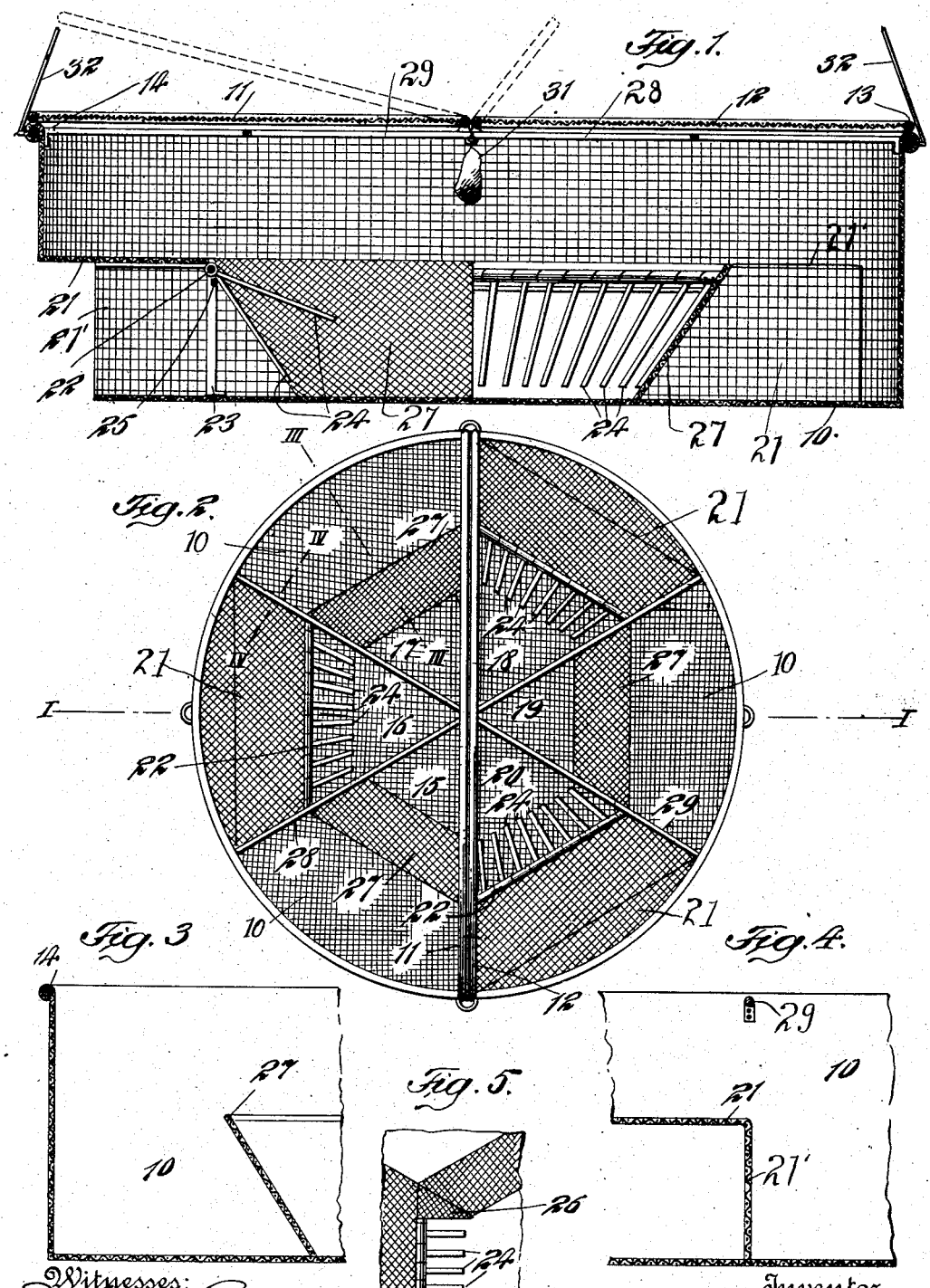

CHARLES HENRY VAN KEUREN, OF JERSEY CITY, NEW JERSEY.

TRAP FOR SHELL-FISH.

973,594.  Specification of Letters Patent.  Patented Oct. 25, 1910.

Application filed January 17, 1910. Serial No. 538,498.

*To all whom it may concern:*

Be it known that I, CHARLES H. VAN KEUREN, a citizen of the United States, and a resident of Jersey City, county of Hudson, and State of New Jersey, have invented certain new and useful Improvements in Traps for Shell-Fish, of which the following is a full, clear, and exact description.

This invention relates more particularly to traps which are adapted to be suspended below the surface of the water and which are adapted to entrap lobsters or the like.

The primary object of the invention is to provide a simple and efficient means for catching lobsters of various sizes and holding the same at a point beyond the entrance of the trap until said trap is removed from the water.

A further object of the invention is to so construct the device that little or no opposition will be offered to a lobster as the same attempts to enter the trap.

With these and other objects in view, the invention will be hereinafter more particularly described with reference to the accompanying drawings, which form a part of this specification, and will then be pointed out in the claims at the end of the description.

In the drawings, Figure 1 is an enlarged section taken on the line I—I of Fig. 2. Fig. 2 is a top plan view of the device with the pivoted cover removed. Fig. 3 is a section taken on the line III—III. Fig. 4 is a section taken on the line IV—IV; and Fig. 5 is a modification of the swinging door sections.

In the drawings, 10 designates the base of a cylindrical wire mesh member provided with pivoted covers 11 and 12. These covers are pivoted centrally of the device and are formed of wire mesh surrounded by a framework 13. The side walls of the cylinder terminate in an enlargement 14 which is shown as a beading in the drawing, but which may be flapped to accommodate the edge portions of the lid members 11 and 12. The device is divided into six compartments, 15, 16, 17, 18, 19 and 20, three of which are adapted to form trap sections which permit of the entrance of a lobster. The other three compartments are adapted to form pockets for receiving the lobster after the same has entered the trap. In forming the trap sections, the base of the cylinder is formed with three V-shaped openings, the top portions 21 of said openings being of wire gauze and integral with the body of the cylinder, and the side walls thereof being also of wire gauze as at 21'. These top portions extend about midway from the periphery of the cylinder to its center. At this point a bar 22 extends transversely across the opening and is supported by standards 23. Pivotally mounted on said bar are a plurality of fingers 24 which are adapted to swing inwardly independent of each other, their outward movement being limited by the cross-bar 25 secured to the standards 23. These fingers are arranged at an angle to the standards 23 and also project inwardly to conform to the general configuration of the triangular opening. However, the same may be perfectly straight as shown in Fig. 5, and the corner section of the triangle taken up with a wire mesh member 26. The fingers are also formed so as to clear the base of the device as the same are swung forward in order that they may not contact with foreign matter which would prevent their swinging.

The pocket members, which are arranged between the trap sections, are provided with a baffle wall 27 which may be of wire mesh, and said baffle wall is arranged at the same angle as the normal angle of the pivoted fingers. It will, therefore, be seen that the three sets of pivoted fingers and the three baffle walls form a hexagon, the side walls of which slope toward its center. As a lobster or other shell fish pushes its way past the pivoted fingers, its tendency will be to crawl over the baffle plate 27 and fall within one of the pockets, thereby clearing the entrance of the trap sections and permitting another lobster to enter. The fact that the fingers 24 are independently pivoted, will permit fish varying in size to enter the receptacle, the fingers conforming to the shape and size of the object pressing against the same.

The wire mesh member 10 is supported by brace rods 28 and 29 and the cover sections 11 and 12 are pivotally connected to cross-bars 30 which are secured to the edge portions of the cylinder. A suitable bait 31 is hung within the cylinder to attract the lobsters, but the same is so positioned as to be out of reach and therefore will not need replenishing. Flexible members 32 are secured to the edge portions of the cylinder for raising and lowering the same.

It will be seen that a simple device of this character may be easily constructed at a small cost and the arrangement of the various parts being such that the same may be readily repaired and replaced.

The device may be modified in many ways without departing from the spirit of the invention. Instead of providing the pivoted door sections, the entrances may be formed with a member such as 27 extending at an angle to the base of the device. It will be seen that as the lobster enters the opening, he will crawl up the slanting member until he drops into the pocket 10. A structure of this sort will be very economical to manufacture, owing to its simplicity in construction, and the same will be found very effective in practice.

Having thus described my invention, I claim as new and desire to secure by Letters Patent:—

1. In a device of the class described, a cylindrical casing provided with a plurality of V-shaped openings located at a point near its base, a plurality of V-shaped pockets interposed between said openings, said openings being provided with a plurality of pivoted fingers arranged at an angle and adapted to normally close said openings, and said pockets being provided with deflecting plates arranged at the same angle as the pivoted fingers.

2. A device of the class described, comprising a cylindrical member, the lower portion of which is provided with a plurality of V-shaped openings, a pocket formed adjacent to each opening, said openings being provided with pivoted closures, deflector plates secured to the base of the cylindrical member and extending at an angle from said base, said pivoted closures being arranged at the same angle as said deflector plates.

3. A device of the class described, comprising a cylindrical perforated receptacle, a plurality of V-shaped openings formed in said receptacle, a plurality of pockets formed in said receptacle, said openings being provided with pivoted closures arranged at an angle, and said pockets being provided with deflector plates arranged at the same angle.

4. A device of the class described, comprising a wire mesh receptacle, a substantially hexagonal receptacle formed within the first-mentioned receptacle, three of the walls of said hexagonal receptacle being pivoted and the other three walls being rigid.

This specification signed and witnessed this 13th day of January A. D. 1910.

CHARLES HENRY VAN KEUREN.

Witnesses:
W. A. TOWNER, Jr.,
MARY DINNHAUPT.